(12) United States Patent
Ishibashi et al.

(10) Patent No.: US 12,744,424 B2
(45) Date of Patent: Sep. 22, 2026

(54) DRIVE DEVICE

(71) Applicant: TOYOTA JIDOSHA KABUSHIKI KAISHA, Toyota (JP)

(72) Inventors: Masayuki Ishibashi, Toyota (JP); Kazunari Inata, Toyota (JP); Jumpei Inoue, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 191 days.

(21) Appl. No.: 18/668,991

(22) Filed: May 20, 2024

(65) Prior Publication Data

US 2024/0413699 A1 Dec. 12, 2024

(30) Foreign Application Priority Data

Jun. 7, 2023 (JP) ................................ 2023-093958

(51) Int. Cl.

*H02K 5/04* (2006.01)
*H02K 7/116* (2006.01)
*H02K 11/00* (2016.01)

(52) U.S. Cl.

CPC ............... *H02K 5/04* (2013.01); *H02K 7/116* (2013.01); *H02K 11/0094* (2013.01)

(58) Field of Classification Search

CPC ...... H02K 5/04; H02K 7/116; H02K 11/0094; H02K 7/003; H02K 2213/03; B60K 17/165; B60K 2001/001; B60K 1/00; B60K 17/08; B60Y 2410/10

See application file for complete search history.

(56) References Cited

U.S. PATENT DOCUMENTS 5,585,681 A * 12/1996 Bitsche ................. B60K 11/02 310/68 R
6,198,183 B1 * 3/2001 Baeumel ................ H02K 5/225 310/52
9,692,277 B2 6/2017 Pearce, Jr. et al.
10,780,849 B1 * 9/2020 Garcia ................ B60R 16/0231

FOREIGN PATENT DOCUMENTS

CN 205417150 U 8/2016
JP 2011091997 A 5/2011
WO 2016110519 A1 7/2016

* cited by examiner

*Primary Examiner* — Tulsidas C Patel
*Assistant Examiner* — Mohammed Ahmed Qureshi
(74) *Attorney, Agent, or Firm* — Oliff PLC

(57) ABSTRACT

A drive device including a motor case, a first case, and a second case is provided. The motor case is configured to house a motor. The first case is configured to house a gear unit that is mechanically connected with the motor. The second case is configured to house an electric power conversion unit that is electrically connected with the motor. The first case and the second case are fastened to the motor case by a plurality of fastening members. The plurality of fastening members includes at least one common fastening member that concurrently fastens the first case and the second case to the motor case.

9 Claims, 3 Drawing Sheets

13
13h
DH1
13s
13f
CA
MH
11h
DH2
60
11f
11
E1
14
14h
12
12h
12f
SS
E2
OS
ES
OA
60,61
60,62
UP
FR
RH

DRIVE DEVICE

CROSS-REFERENCE TO RELATED APPLICATION

This application claims priority to Japanese Patent Application No. 2023-093958 filed on Jun. 7, 2023, incorporated herein by reference in its entirety.

BACKGROUND

1. Technical Field

The technology disclosed in the present specification relates to a drive device for a vehicle.

2. Description of Related Art

A drive device for a vehicle that is disclosed in U.S. Pat. No. 9,692,277 has a configuration in which a motor case that houses a motor, a gear case that houses a gear unit, and an electric power conversion unit case that houses an electric power conversion unit are integrally fastened.

SUMMARY

For an integrated drive device such as the above drive device for the vehicle that is disclosed in U.S. Pat. No. 9,692,277, it is desired to achieve both the securement of the capacities of the gear case and the electric power conversion unit case and the reduction in the physical size of the drive device.

Hence, the present specification discloses an integrated drive device that allows the reduction in physical size.

An aspect of the present disclosure relates to a drive device for a vehicle that includes a motor case, a first case, and a second case. The motor case is configured to house a motor. The first case is configured to house a gear unit that is mechanically connected with the motor. The second case is configured to house an electric power conversion unit that is electrically connected with the motor. The first case and the second case are fastened to the motor case by a plurality of fastening members. The plurality of fastening members includes at least one common fastening member that concurrently fastens the first case and the second case to the motor case.

In the drive device, generally, in a configuration in which fastening members are used for fastening cases, a space for disposing fastening members is necessary. As a result, in some cases, the capacities of the cases cannot be secured, or the physical size of the drive device is increased. The drive device for the vehicle in the above aspect includes the common fastening member that concurrently fastens the first case and the second case to the motor case. Thereby, the total number of necessary fastening members can be reduced. Since the total number of fastening members can be reduced, the space for disposing fastening members can be reduced. It is possible to achieve the securement of the capacities of the first case and the second case and the reduction in the physical size of the drive device.

In the drive device for the vehicle in the aspect of the present disclosure, the second case may be disposed on the first case, at the position of the at least one common fastening member.

In the above configuration, it is possible to concurrently fasten the first case and the second case to the motor case.

In the drive device for the vehicle that has the above configuration, the first case may include a first flange that extends along an outer periphery of the first case and that is fixed to the motor case by some of the plurality of fastening members. The second case may include a second flange that extends along an outer periphery of the second case and that is fixed to the motor case by some of the plurality of fastening members. A part of the first flange may include an overlap section that is positioned between the motor case and the second flange. The at least one common fastening member may include at least one first common fastening member that is positioned at the overlap section.

In the above configuration, it is possible to reduce the total number of fastening members, by using the first common fastening member at the overlap section between the first flange and the second flange.

In the drive device for the vehicle that has the above configuration, the first case may further include an extension portion that extends between the motor case and the second flange, along an outer edge of the second case, from one end of the overlap section to the other end of the overlap section. The at least one common fastening member may include at least one second common fastening member that is positioned at the extension portion.

In the above configuration, the whole of the outer edge of the second case can be fastened by the first common fastening member and the second common fastening member.

In the drive device for the vehicle that has the above configuration, the average thickness of the second flange may be larger than the average thickness of the first flange.

Since the fastening member contacts with the second flange, a great force is applied to the second flange by the fastening member. In the above configuration, it is possible to cause the second flange to have a higher strength than the first flange, and therefore it is possible to restrain the breakage of the second flange.

In the drive device for the vehicle in the aspect of the present disclosure, the motor may include a motor shaft. At least a part of the second case may overlap with the first case in a direction perpendicular to the central axis of the motor shaft.

In the above configuration, it is possible to decrease the protrusion amount of the second case in the central axis direction of the motor shaft. It is possible to reduce the physical size of the drive device.

In the drive device for the vehicle that has the above configuration, at least a part of the second case may overlap with the motor in a central axis direction of the motor shaft.

In the above configuration, it is possible to decrease the protrusion amount of the second case in the direction perpendicular to the central axis of the motor shaft. It is possible to reduce the physical size of the drive device.

In the drive device for the vehicle that has the above configuration, the second case may be disposed along a part of a circumference around the motor shaft, as viewed from the central axis direction of the motor shaft. The disposition range of the second case in the rotation direction of the motor may be 180° or more around the motor shaft.

In the above configuration, it is possible to effectively utilize the space around the motor shaft.

In the drive device for the vehicle in the aspect of the present disclosure, the motor may include a motor shaft. Each of the plurality of fastening members may include a bolt. The longitudinal direction of the bolt may be roughly parallel to the central axis of the motor shaft.

In the drive device for the vehicle in the aspect of the present disclosure, the first case may constitute a first space that houses the gear unit, between the motor case and the first case.

In the drive device for the vehicle in the aspect of the present disclosure, the second case may constitute a second space that houses the electric power conversion unit, between the motor case and the second case.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
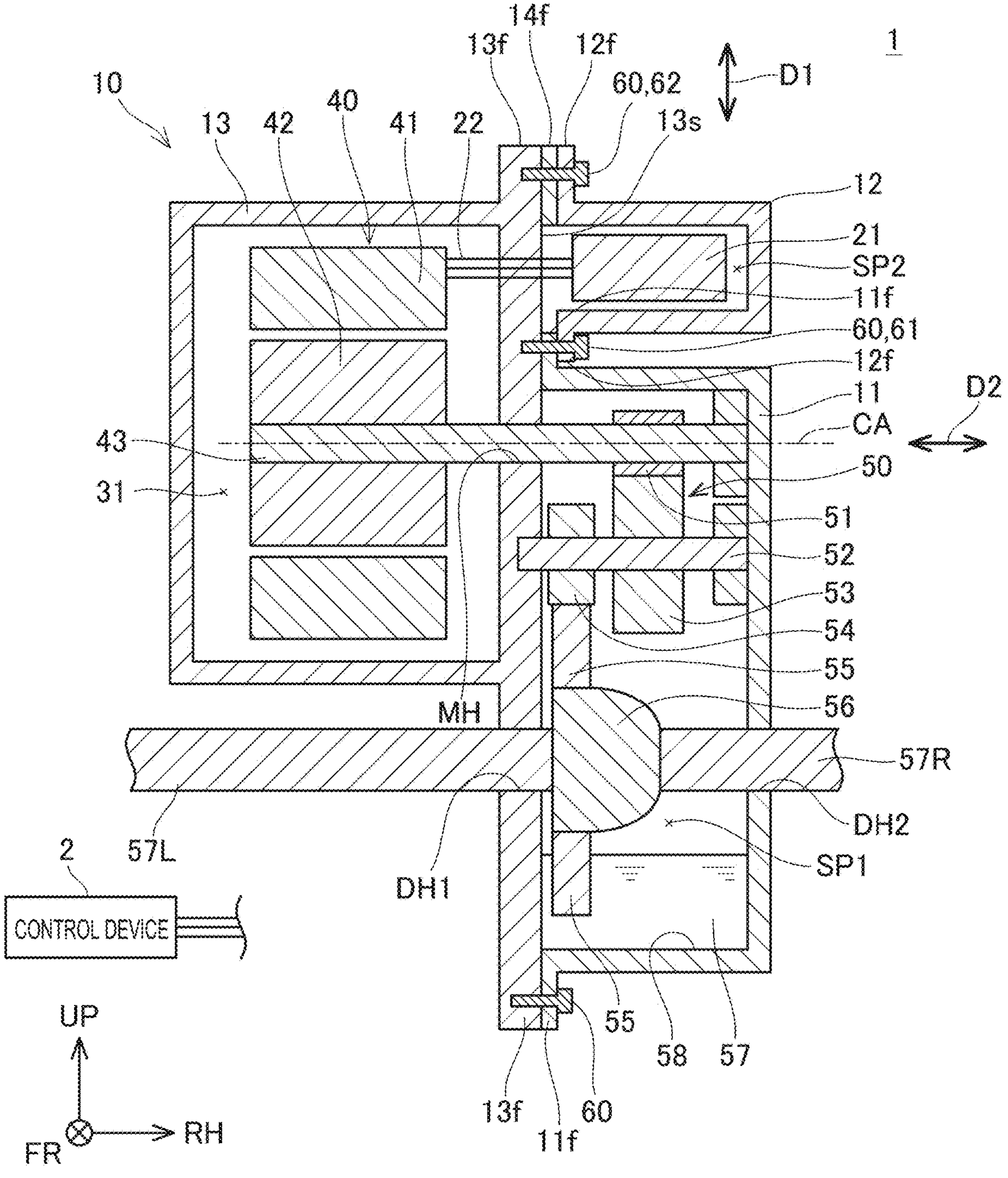
FIG. 1 is a sectional view showing a schematic configuration of a drive device in an embodiment as an example of the present disclosure.

The configuration of a drive device 1 for a vehicle will be described with reference to FIG. 1. FIG. 1 is a sectional view showing a schematic configuration of the drive device 1 in an embodiment. The drive device 1 is an integrated device in which a motor, a gear unit, and an electric power conversion unit for controlling the motor are stored in an identical casing. Each of directions FR, RH and UP indicates the orientation of the drive device 1 with respect to the vehicle (battery electric vehicle) when the drive device 1 is installed in the vehicle. The direction FR indicates the forward direction of the front-rear direction of the vehicle. The direction RH indicates the rightward direction of the right-left direction (or the width direction) of the vehicle. The direction UP indicates the upward direction of the top-bottom direction of the vehicle. The same goes for the other figures. In FIG. 1, a plurality of shafts (a motor shaft 43, a countershaft 52, and drive shafts 57L, 57R) are arranged and shown so as to be positioned on an identical plane.

The drive device 1 is controlled by a control device 2. The control device 2 includes a CPU, a RAM, a ROM, input and output interfaces, and the like. The control device 2 is connected with an electric power conversion unit 21 and the like, by unillustrated signal lines.

The drive device 1 includes a casing 10. The casing 10 includes a first case 11, a second case 12, and a motor case 13. Each of the first case 11, the second case 12, and the motor case 13 may be a casting.

The motor case 13 includes a motor compartment 31. In the motor compartment 31, a motor 40 is stored. In other words, the motor case 13 houses the motor 40. The motor 40 includes a stator 41, a rotor 42, and the motor shaft 43. The stator 41 includes a cylindrical shape. In the interior of the stator 41, the rotor 42 is disposed in a rotatable fashion. The motor shaft 43 has a central axis CA.

Further, the motor case 13 includes a facing surface 13*s* that faces the first case 11 and the second case 12. On the facing surface 13*s*, a motor shaft hole MH and a drive shaft hole DH1 are formed. The motor shaft 43 passes through the motor shaft hole MH. The drive shaft 57L on the left side passes through the drive shaft hole DH1.

The first case 11 has a box shape in which one surface is opened. The first case 11 is fastened to the facing surface 13*s* such that the opening surface is closed by the facing surface 13*s*. The manner of the fastening will be described later. Thereby, a first space SP1 is constituted between the motor case 13 and the first case 11. In the first space SP1, a gear unit 50 is stored. In other words, the first case 11 houses the gear unit 50.

The gear unit 50 includes a shaft gear 51, the countershaft 52, a first counter gear 53, a second counter gear 54, a ring gear 55, and a differential gear 56. The shaft gear 51 is attached to the motor shaft 43. Thereby, the gear unit 50 and the motor 40 are mechanically connected. The first counter gear 53 and the second counter gear 54 are attached to the countershaft 52. The first counter gear 53 engages with the shaft gear 51. The second counter gear 54 engages with the ring gear 55. The ring gear 55 is attached to the differential gear 56. The pair of the drive shafts 57L, 57R extends from the differential gear 56 in the vehicle-width direction. The drive shaft 57R passes through a drive shaft hole DH2 that is formed on the first case 11. At a lower portion of the first space SP1, a retention portion 58 is included. In the retention portion 58, oil 57 is retained. A part of the gear unit 50 is immersed in the oil 57 retained in the retention portion 58.

The second case 12 has a box shape in which one surface is opened. The second case 12 is fastened to the facing surface 13*s* such that the opening surface is closed by the facing surface 13*s*. The manner of the fastening will be described later. Thereby, a second space SP2 is constituted between the motor case 13 and the second case 12. In the second space SP2, the electric power conversion unit 21 is stored. In other words, the second case 12 houses the electric power conversion unit 21. The electric power conversion unit 21 is a part for controlling the electric power that is supplied to the motor 40 and the electric power that is generated by the motor 40. Examples of components that are included in the electric power conversion unit 21 include an inverter and a converter. The electric power conversion unit 21 is electrically connected with the motor 40 by a bus bar 22.

Figure 2:
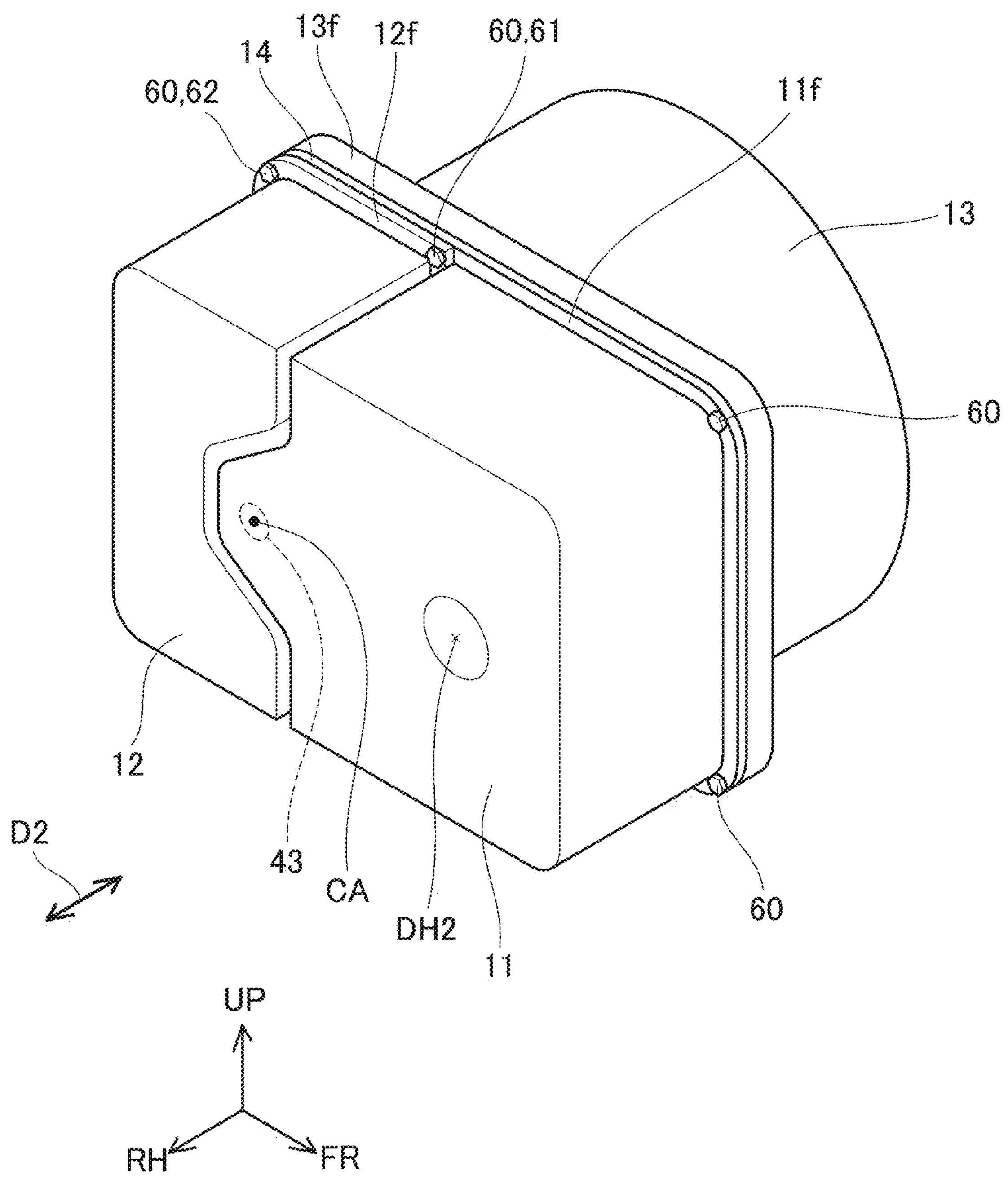
FIG. 2 is a perspective view of a casing that composes the drive device shown in FIG. 1.
Figure 3:
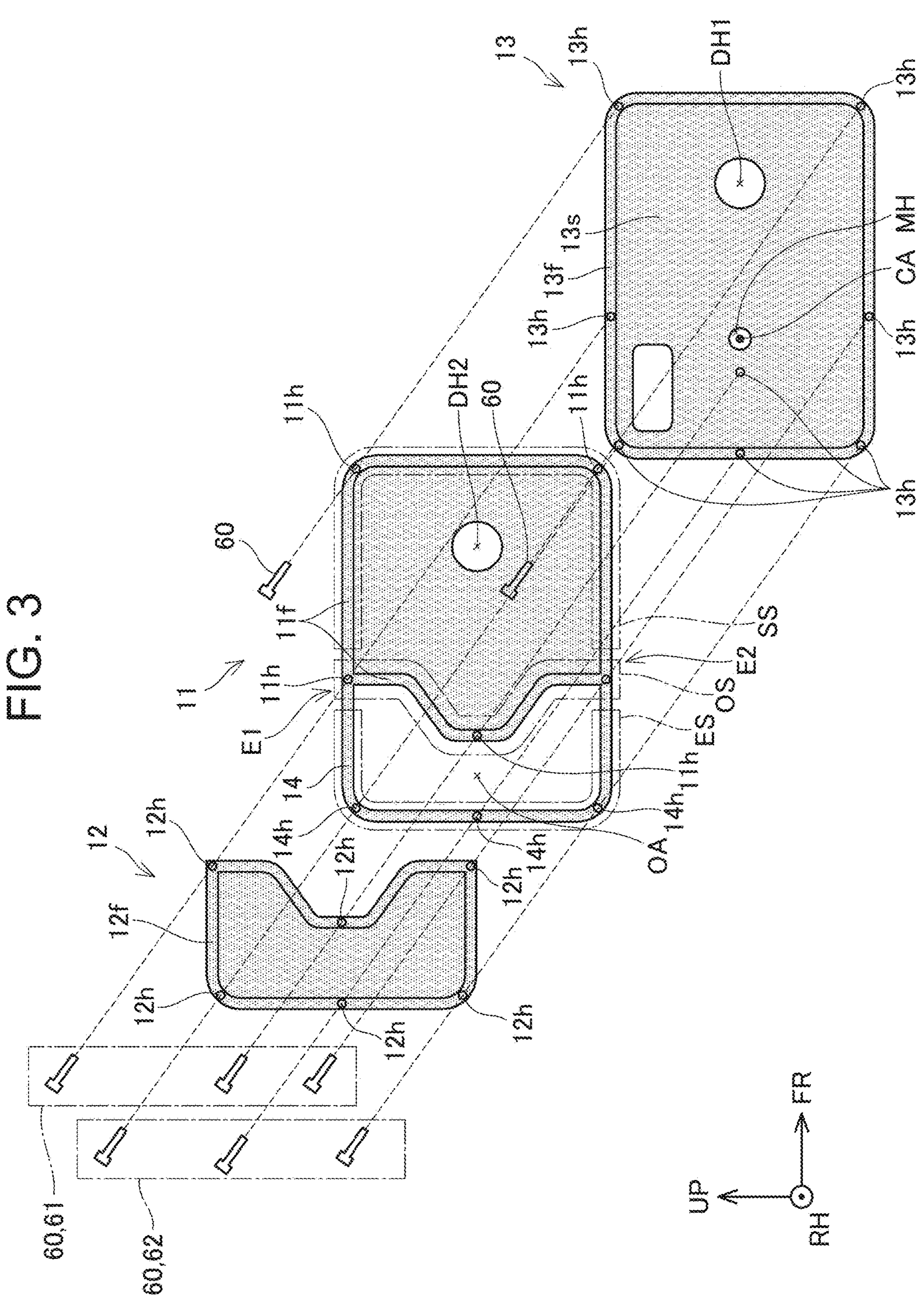
FIG. 3 is an exploded plan view of the casing.

Next, the configuration of the casing 10 will be described with reference to FIG. 2 and FIG. 3. FIG. 2 shows a perspective view of the casing 10. FIG. 3 is an exploded pan view of the casing 10. In FIG. 2 and FIG. 3, various components that are stored in the interior of the casing 10 are not illustrated. In FIG. 2, the position of the motor shaft 43 is shown by a dotted line.

The first case 11 includes a first flange 1If that extends along an outer periphery of the first case 11. In FIG. 3, the first flange 11*f* is formed at an overlap section OS and a section SS. The second case 12 includes a second flange 12*f* that extends along the outer periphery of the second case 12. The motor case 13 includes a motor case flange 13*f* that extends along the outer periphery of the motor case 13. On the first flange 11*f*, a plurality of fastening holes 11*h* is disposed. On the second flange 12*f*, a plurality of fastening holes 12*h* is disposed. On the motor case flange 13*f* and the facing surface 13*s*, a plurality of fastening holes 13*h* is disposed.

As shown in FIG. 3, a part of the first flange 11*f* includes the overlap section OS. The overlap section OS is an area where the second flange 12*f* laps over the first flange 11*f*. In other words, at the overlap section OS, the first flange 11*f* is positioned between the facing surface 13*s* of the motor case 13 and the second flange 12*f*.

Further, the first case 11 includes an extension portion 14 that extends from an end portion E1 of the overlap section OS to an end portion E2 of the overlap section OS. The extension portion 14 is a frame-shaped member that extends along an outer edge of the second case 12. The extension portion 14 has the same thickness as the first flange 11*f*. The extension portion 14 is formed integrally with the first case 11. On the extension portion 14, a plurality of fastening holes 14*h* is disposed. A base having a closed ring shape is formed by the first flange 11*f* disposed at the overlap section OS and the extension portion 14. An opening area OA is formed on the inside of the ring-shaped base. The ring-shaped base is formed so as to overlap with the second flange 12*f* over the whole periphery when the second case 12 is mounted. That is, the ring-shaped base functions also as a spacer ring.

The first case 11 and the second case 12 are fastened to the motor case 13 by a plurality of bolts 60. The longitudinal direction of the plurality of bolts 60 is roughly parallel to the central axis CA of the motor shaft 43. Specific descriptions will be made. The plurality of bolts 60 includes at least one first common bolt 61 that is disposed at the overlap section OS. In other words, at the position of the first common bolt 61, the second case 12 is disposed on the first case 11. At the overlap section OS, the fastening hole 12*h* of the second flange 12*f*, the fastening hole 11*h* of the first flange 11*f*, and the fastening hole 13*h* of the motor case 13 coincides with each other. The first common bolt 61 passes through the fastening hole 12*h* and the fastening hole 11*h*, and is inserted into the fastening hole 13*h*. Thereby, the first case 11 and the second case 12 are concurrently fastened to the motor case 13.

Further, the plurality of bolts 60 include at least one second common bolt 62 that is disposed at an extension-portion section ES where the extension portion 14 exists. At the extension-portion section ES, the second common bolt 62 passes through the fastening hole 12*h* and the fastening hole 14*h*, and is inserted into the fastening hole 13*h*. Thereby, the extension portion 14 and the second case 12 are concurrently fastened to the motor case 13. In other words, the extension portion 14 is positioned between the motor case 13 and the second flange 12*f*.

At the section SS of the first flange 11*f*, which is a section other than the overlap section OS, bolts 60 are disposed. At the section SS, each bolt 60 passes through the fastening hole 11*h*, and is inserted into the fastening hole 13*h* (see FIG. 2). Thereby, the first case 11 is fastened to the motor case 13.

The average thickness of the second flange 12*f* is larger than the average thickness of the first flange 11*f*. The effect will be described. The bolt contacts with the second flange 12*f* at the area where the first case 11 and the second case 12 are concurrently fastened to the motor case 13. Accordingly, by the bolt, a greater force is applied to the second flange 12*f* than to the first flange 11*f*. Hence, the strength of the second flange 12*f* is set so as to be higher than the strength of the first flange 11*f*, and thereby it is possible to restrain the breakage of the second flange 12*f*.

Next, the position relation between the first case 11 and the second case 12 will be described with reference to FIG. 1 and FIG. 2. As shown in FIG. 1, at an area on the opposite side of the motor shaft 43 from the gear unit 50, a space is formed due to a dimensional difference between the motor 40 and the gear unit 50. In this space, the second case 12 is disposed. That is, at least a part of the second case 12 overlaps with the first case 11 in a direction D1 perpendicular to the central axis CA of the motor shaft 43. Thereby, it is possible to effectively utilize the space around the motor shaft 43. Consequently, it is possible to decrease the protrusion amount of the second case 12 in a central axis direction D2 of the motor shaft 43. It is possible to reduce the physical size of the drive device 1.

Further, at least a part of the second case 12 overlaps with the motor 40 in the central axis direction D2. This also makes it possible to effectively utilize the space around the motor shaft 43. Consequently, it is possible to decrease the protrusion amount of the second case 12 in the direction D1 perpendicular to the central axis CA.

As shown in FIG. 2, the second case 12 is disposed along a part of a circumference around the motor shaft 43, as viewed from the central axis direction D2 of the motor shaft 43. Moreover, the disposition range of the second case 12 in the rotation direction of the motor is 180° or more around the motor shaft 43. Thereby, it is possible to sufficiently secure the capacity of the second case 12.

Next, effects of the drive device for the vehicle will be described. In a configuration in which a case is fastened using bolts, generally, it is necessary to secure a space such as a tool gap, around bolt fastening portions. As the number of bolt fastening portions is larger, the necessary space is larger, and therefore the capacity of the case is sometimes restricted. In the technology in the present specification, the first case 11 and the second case 12 can be concurrently fastened to the motor case 13, using the first common bolt 61, at the overlap section OS between the first flange 11*f* and the second flange 12*f*. Thereby, the total number of necessary bolts can be reduced, and therefore the necessary space for bolts can be reduced. It is possible to achieve the securement of the capacities of the first case 11 and the second case 12 and the reduction in the physical size of the drive device 1.

In the case where the extension portion 14 does not exist, a level difference corresponding to the thickness of the first flange 11*f* is formed between the overlap section OS and the extension-portion section ES (see FIG. 3). There is a risk that the level difference makes it hard to secure sealing property. In the technology in the present specification, since the extension portion 14 is included, it is possible to equalize the height between the overlap section OS and the extension portion section ES. It is possible to enhance the sealing property of the second case 12.

In the technology in the present specification, it is possible to form the spacer ring by the first flange 11*f* and the extension portion 14. Then, it is possible to cause the spacer ring to function as a cushion, and therefore it is possible to restrain the vibration of the second case 12.

The embodiments have been described above in detail. However, the embodiments are just examples, and do not limit the claims. The technology described in the claims includes various modifications and alterations of the above-described specific examples. The technical elements described in the present specification and the drawings exert technical utility independently or by various combinations, and are not limited to the combinations described in the claims at the time of filing. Further, the technology exemplified in the present specification and the drawings concurrently achieves a plurality of purposes, and has technical utility simply by achieving one purpose of them.

Next, modifications of the drive device for the vehicle in the embodiment will be described. As the position relation between the first case 11 and the second case 12, various position relations may be adopted. For example, the second case 12 may be disposed on the first case 11. In this case, the second space SP2 may be constituted between the first case 11 and the second case 12. Also in such an aspect, by including the overlap section OS, it is possible to reduce the total number of necessary bolts.

The function of the first case 11 and the function of the second case 12 may be swapped. That is, the first case 11 may house the electric power conversion unit 21, and the second case 12 may house the gear unit 50.

The first case 11 may exclude the extension portion 14. Further, the extension portion 14 may be a separate component from the first case 11.

The vehicle equipped with the drive device in the present specification is not limited to the battery electric vehicle. For example, the drive device in the present specification can be equipped in a hybrid electric vehicle or a plug-in hybrid electric vehicle. In this case, in the casing of the drive device in the present specification, a plurality of motors may be stored, or a planetary gear mechanism may be stored. Further, the drive device in the present specification can be applied also to a vehicle that uses an electric motor in at least a part of traveling, for example, to a fuel cell electric vehicle or the like.

What is claimed is:

1. A drive device for a vehicle, comprising:

a motor case configured to house a motor;

a first case configured to house a gear unit that is mechanically connected with the motor; and a second case configured to house an electric power conversion unit that is electrically connected with the motor, wherein the first case and the second case are fastened to the motor case by a plurality of fastening members, the plurality of fastening members includes at least one common fastening member that concurrently fastens the first case and the second case to the motor case, the second case is disposed on the first case, at a position of the at least one common fastening member, the first case includes a first flange that extends along an outer periphery of the first case and that is fixed to the motor case by some of the plurality of fastening members, the second case includes a second flange that extends along an outer periphery of the second case and that is fixed to the motor case by some of the plurality of fastening members, a part of the first flange includes an overlap section that is positioned between the motor case and the second flange, and the at least one common fastening member includes at least one first common fastening member that is positioned at the overlap section.

2. The drive device according to claim 1, wherein:

the first case further includes an extension portion that extends between the motor case and the second flange, along an outer edge of the second case, from one end of the overlap section to the other end of the overlap section; and the at least one common fastening member includes at least one second common fastening member that is positioned at the extension portion.

3. The drive device according to claim 1, wherein an average thickness of the second flange is larger than an average thickness of the first flange.

4. The drive device according to claim 1, wherein:

the motor includes a motor shaft; and at least a part of the second case overlaps with the first case in a direction perpendicular to a central axis of the motor shaft.

5. The drive device according to claim 4, wherein at least a part of the second case overlaps with the motor in a central axis direction of the motor shaft.

6. The drive device according to claim 5, wherein:

the second case is disposed along a part of a circumference around the motor shaft, as viewed from the central axis direction of the motor shaft; and a disposition range of the second case in a rotation direction of the motor is 180° or more around the motor shaft.

7. The drive device according to claim 1, wherein:

the motor includes a motor shaft;

each of the plurality of fastening members includes a bolt; and a longitudinal direction of the bolt is roughly parallel to a central axis of the motor shaft.

8. The drive device according to claim 1, wherein the first case constitutes a first space that houses the gear unit, between the motor case and the first case.

9. The drive device according to claim 1, wherein the second case constitutes a second space that houses the electric power conversion unit, between the motor case and the second case.

* * * * *